United States Patent
Rossetto et al.

(10) Patent No.: US 12,292,909 B2
(45) Date of Patent: May 6, 2025

(54) TOPIC-BASED DOCUMENT SEGMENTATION

(71) Applicant: Yext, Inc., New York, NY (US)

(72) Inventors: Allison Rossetto, New York, NY (US); Michael Misiewicz, Brooklyn, NY (US)

(73) Assignee: Yext, Inc., New York, NY (US)

(*) Notice: Subject to any disclaimer, the term of this patent is extended or adjusted under 35 U.S.C. 154(b) by 289 days.

(21) Appl. No.: 17/854,829

(22) Filed: Jun. 30, 2022

(65) Prior Publication Data

US 2024/0004911 A1    Jan. 4, 2024

(51) Int. Cl.
*G06F 16/33*     (2019.01)
*G06F 16/334*    (2025.01)
*G06F 18/20*     (2023.01)
*G06F 40/205*    (2020.01)

(52) U.S. Cl.
CPC ........ *G06F 16/3347* (2019.01); *G06F 18/295* (2023.01); *G06F 40/205* (2020.01)

(58) Field of Classification Search
CPC .. G06F 16/3347; G06F 18/295; G06F 40/205; G06F 40/216; G06F 40/289; G06F 40/131; G06F 40/30
USPC .......................................................... 704/9
See application file for complete search history.

(56) References Cited

U.S. PATENT DOCUMENTS

| | | | | |
|---|---|---|---|---|
| 9,672,555 B1 * | 6/2017 | Dillard | ...................... | G06F 16/35 |
| 10,701,175 B1 * | 6/2020 | Kolcz | ...................... | G06Q 50/01 |
| 11,232,266 B1 * | 1/2022 | Biswas | ...................... | G06F 40/35 |
| 11,269,665 B1 * | 3/2022 | Podgorny | .............. | G06N 20/00 |
| 11,463,587 B1 * | 10/2022 | Williams | ............ | H04M 3/5175 |
| 11,631,021 B1 * | 4/2023 | Benjamin | .............. | G06Q 50/18 |
| | | | | 704/1 |
| 11,631,401 B1 * | 4/2023 | Nudd | ..................... | G16H 80/00 |
| | | | | 704/9 |
| 11,640,420 B2 * | 5/2023 | Beaugh | ................ | G06F 40/117 |
| | | | | 715/254 |
| 11,675,833 B2 * | 6/2023 | Chang | .............. | G06F 16/90324 |
| | | | | 707/748 |
| 11,922,122 B2 * | 3/2024 | Bullock | ............... | G06F 40/279 |
| 2007/0192104 A1 * | 8/2007 | Blewett | ................... | G10L 15/28 |
| | | | | 704/E15.046 |
| 2009/0067719 A1 | 3/2009 | Sridhar | | |
| 2013/0018651 A1 * | 1/2013 | Djordjevic | ............ | G06Q 10/00 |
| | | | | 704/9 |

(Continued)

OTHER PUBLICATIONS

PCT Notification of Transmittal of the International Search Report and the Written Opinion of the International Searching Authority for PCT Application No. PCT/US2023/023666, mailed Aug. 25, 2023, 15 pages.

(Continued)

*Primary Examiner* — Thuykhanh Le
(74) *Attorney, Agent, or Firm* — Jeffri A. Kaminski; Venable LLP

(57) ABSTRACT

A system and method to identify a document including text relating to a merchant system. The document is segmented into a set of sentences. A first machine-learning model executed by a processing device generates an initial topic segmentation corresponding to the set of sentences. A second machine-learning model is applied to the initial topic segmentation to generate a final topic segmentation corresponding to the document.

16 Claims, 6 Drawing Sheets

(56) References Cited

U.S. PATENT DOCUMENTS

| | | | |
|---|---|---|---|
| 2013/0325953 A1* | 12/2013 | Jin | G06Q 50/01 709/204 |
| 2015/0310096 A1 | 10/2015 | Bao | |
| 2016/0188672 A1* | 6/2016 | Lev | G06Q 30/0281 707/728 |
| 2016/0328480 A1* | 11/2016 | Owens | G06F 16/9535 |
| 2017/0270096 A1* | 9/2017 | Sheafer | G06F 40/295 |
| 2018/0173792 A1 | 6/2018 | Kesin | |
| 2018/0293507 A1 | 10/2018 | Lian | |
| 2018/0329985 A1* | 11/2018 | Bao | G06F 16/3334 |
| 2019/0065466 A1* | 2/2019 | Kataoka | G06F 40/30 |
| 2019/0236206 A1* | 8/2019 | Chowdhury | G06F 40/242 |
| 2019/0286701 A1* | 9/2019 | Kataoka | G06F 40/253 |
| 2019/0286702 A1* | 9/2019 | Kataoka | G06F 40/129 |
| 2019/0341021 A1* | 11/2019 | Shang | G06N 3/045 |
| 2019/0377746 A1* | 12/2019 | Kataoka | G06F 40/216 |
| 2020/0073902 A1* | 3/2020 | Milazzo | G06F 16/9536 |
| 2020/0125803 A1 | 4/2020 | Jezewski | |
| 2020/0210522 A1* | 7/2020 | Wang | G06F 40/35 |
| 2020/0279019 A1* | 9/2020 | Peterson | G06F 16/35 |
| 2021/0104234 A1* | 4/2021 | Zhang | G06F 40/30 |
| 2021/0104240 A1* | 4/2021 | Saeki | G10L 15/22 |
| 2021/0191981 A1* | 6/2021 | Deibler | G06F 16/345 |
| 2021/0248322 A1* | 8/2021 | Modani | G06V 30/416 |
| 2021/0264115 A1* | 8/2021 | Wang | G06F 16/26 |
| 2021/0287563 A1* | 9/2021 | Kataoka | G06F 16/285 |
| 2021/0295822 A1* | 9/2021 | Tomkins | G06F 16/3338 |
| 2021/0303783 A1* | 9/2021 | Misra | G06F 16/9024 |
| 2022/0005463 A1 | 1/2022 | Bender | |
| 2022/0013023 A1* | 1/2022 | Hellman | G06N 3/08 |
| 2022/0076025 A1* | 3/2022 | Shin | G06V 20/49 |
| 2022/0076026 A1* | 3/2022 | Walker | G06V 40/161 |
| 2022/0094651 A1* | 3/2022 | Lee | G06F 40/30 |
| 2022/0147770 A1 | 5/2022 | Jain | |
| 2022/0188363 A1* | 6/2022 | Miyazaki | G10L 15/22 |
| 2022/0237368 A1* | 7/2022 | Tran | G06N 20/00 |
| 2022/0309428 A1* | 9/2022 | Powers | G06N 20/00 |
| 2022/0318512 A1* | 10/2022 | Choi | G06F 40/30 |
| 2022/0358151 A1* | 11/2022 | Baradaran Hashemi | G06F 16/9558 |
| 2022/0358521 A1* | 11/2022 | Emmanuel | G06F 40/226 |
| 2022/0365993 A1* | 11/2022 | Voisin | G06F 40/30 |
| 2022/0398382 A1* | 12/2022 | Bachtiar | G06N 5/048 |
| 2022/0405503 A1* | 12/2022 | Kaza | G06V 10/774 |
| 2022/0414123 A1* | 12/2022 | Cakaloglu | G06Q 50/01 |
| 2023/0004718 A1* | 1/2023 | Helvik | G06F 40/30 |
| 2023/0035155 A1* | 2/2023 | Huang | H04N 7/147 |
| 2023/0068878 A1* | 3/2023 | Dwivedi | G06F 18/2148 |
| 2023/0103834 A1* | 4/2023 | Jeong | G06F 40/284 704/9 |
| 2023/0126032 A1* | 4/2023 | Swerdlow | H04M 3/53383 455/413 |
| 2023/0142351 A1* | 5/2023 | M | G06F 16/148 707/737 |
| 2023/0161965 A1* | 5/2023 | Polak | G06F 40/30 704/9 |
| 2023/0164095 A1* | 5/2023 | Ramanathan | G06N 3/044 709/206 |
| 2023/0169442 A1* | 6/2023 | Grob | G06N 3/048 705/28 |
| 2023/0222281 A1* | 7/2023 | Shin | G06F 40/30 704/9 |
| 2023/0237257 A1* | 7/2023 | Walters | H04L 67/02 715/229 |
| 2023/0252114 A1* | 8/2023 | Cabrera Lozoya | G06F 21/31 726/7 |
| 2023/0252224 A1* | 8/2023 | Tran | G06F 40/56 715/256 |
| 2023/0259991 A1* | 8/2023 | Sethuraman | G06F 16/906 705/347 |

OTHER PUBLICATIONS

Arnold et al., "SECTOR: A Neural Model for Coherent Topic Segmentation and Classification" Computation and Language (cs. CL); arXiv:1902.04793v1 [cs.CL] Feb. 13, 2019; retrieved on [18.07.2023]; retrieved from the internet <URL: https://arxiv.org/pdf/1902.04793.pdf> entire document, 16 pages.

* cited by examiner

TOPIC-BASED DOCUMENT SEGMENTATION

TECHNICAL FIELD

The disclosure relates generally to a search platform to provide search results relating to data associated with a merchant system.

BACKGROUND

Conventionally, an end-user (e.g., a consumer) may conduct a search for information about a merchant using a third party search engine (e.g., Google™, Bing™, Yahoo!™ Search) or a third-party platform (e.g., Yelp™, YouTube™, etc.). It is increasing important for a merchant to have accurate and consumable search results associated with the merchant provided to a consumer.

Millions of unstructured documents may be processed in order to effectively provide information related to a merchant for consumption by an end-user (e.g., a consumer). A merchant may have documents including their related data organized on a platform that is searchable using via multiple search provider systems. The platform can be organized as a data or knowledge graph associated with the merchant which stores the merchant's publicly facing, structured data as entities that enable multiple different output formats, such as listings, pages and "answers" including data structured as an answer to a search query (e.g., a frequently asked question (FAQ)-type format).

The merchant data can include documents (e.g., unstructured documents) having a variety of different forms and formats. However, it is difficult to provision relevant and responsive data from an unstructured document as a search result in response to a search query relating to a merchant. For example, a user system may submit a search query that is submitted in the form of a question. The response, or search result, can include an answer to the unstructured search query. To effectively provision information relating to a merchant, there is a need to organize and manage the unstructured documents of a data graph associated with the merchant. In this regard, the unstructured documents require processing to organize the document into logical segments for consumption by an end-user.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
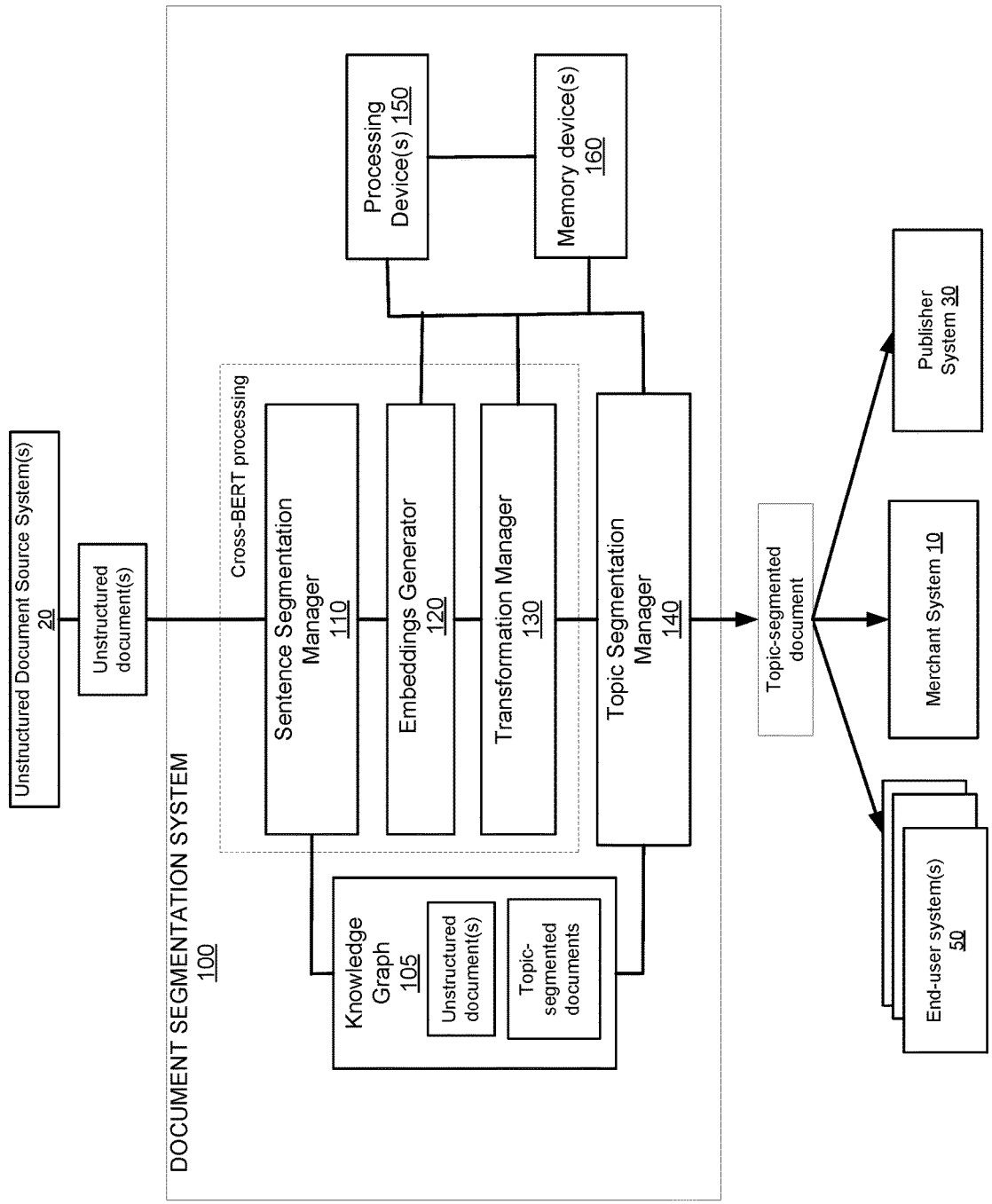
FIG. 1 illustrates an example of a computing environment including a document segmentation system to generate a topic-segmented document, in accordance with one or more embodiments of the present disclosure.

The present disclosure is illustrated by way of example, and not by way of limitation, and can be more fully understood with reference to the following detailed description when considered in connection with the figures provided and described herein.

Aspects of the present disclosure relate to a method and system (also referred to as a "machine learning-based document segmentation system" or "document segmentation system") to execute machine learning-based segmentation of unstructured documents relating to data associated with a merchant system. In an embodiment, the document segmentation system performs multiple levels of segmentation of a document to generate a document that is segmented by topic. According to embodiments, the topic-segmented document can be stored in a data graph associated with a merchant system (also referred to as a "knowledge graph" of the merchant system) to enable the provisioning of the topic-segmented documents to a destination system (e.g., one or more end-user systems, one or more publisher systems, one or more search providers, etc.)

In an embodiment, the document segmentation system is configured to execute multiple levels of machine-learning processing to transform an unstructured document associated with a merchant system to a topic-segmented document. In an embodiment, during a first phase of machine learning process, a first machine-learning model is executed to generate a rough or initial topic-segmented document. In an embodiment, during a second phase of the machine-learning process a second machine-learning model is executed to produce a final topic-segmented document based on the initial topic-segmented document. In an embodiment, the final topic-segmented document (e.g., the document with the topic segments) may be displayed via a graphical user interface with visual elements or indications corresponding to the respective topic segments. For example, the topic-segmented document can be generated to include a paragraph break or line break corresponding to each of the identified topic segments, to improve the readability of the document.

In an embodiment, the document segmentation system has access to a repository or source of unstructured documents to obtain the unstructured documents for segmentation processing. In an embodiment, in a first segmentation phase, the document segmentation system employs a first machine-learning model to generate a sentence-based segmentation. The first machine-learning model segments the input document into sentences and generates a set of embeddings corresponding to the sentences to generate an initial or rough topic segmentation of the document. In an embodiment, the first machine-learning model analyzes a local content surrounding a candidate or potential segment break. The first machine-learning model of the document segmentation system generates a set of probabilities corresponding to the identified set of sentences. In an embodiment, a probability is generated for each of sentence and represents a likelihood that a given sentence representing a start of a new topic.

In an embodiment, the initial set of probabilities or weights corresponding to each sentence are processed by a second machine-learning model of the document segmentation system. The second machine-learning model is configured to process the initial weights corresponding to the initial or rough topic segmentation and the corresponding embeddings and generate an updated set of weights or probabilities (e.g., probabilities that a sentence is "a new topic" or "not a new topic"). The updated weights are used to generate a topic segmented output document having a set of topic-based segments (e.g., a document including a set of topics). In an embodiment, the final topic segmented document associated with the merchant system generated by the second phase of machine-learning processing can be stored in a knowledge graph associated with the merchant system or provisioned to an end-user system (e.g., in response to a search query for which the topic segmented document is part of the search results) or publisher system (e.g., in response to a search query initiated via the publisher system or for storage by the publisher system for future processing).

Advantageously, the multiple layers of segmenting using machine learning models produces more accurate topic segmented documents (e.g., more accurate topic breaks). Furthermore, the document segmentation system according to embodiments of the present application can be performed quickly and efficiently to produce topic segmented documents based on input unstructured documents, which enables the provisioning of the text segmented documents for consumption (e.g., in response to a search query) with improved readability and document organization.

FIG. 1 illustrates an example document segmentation system 100 according to embodiments of the present disclosure. In one embodiment, the document segmentation system 100 includes one or more modules, one or more processing devices and one or more memory devices configured to execute and store instructions associated with the functionality of the various components, services, and modules of the document segmentation system, as described in greater detail below in connection with FIGS. 1-6.

The document segmentation system 100 may be communicatively connected to one or more merchant systems 10, one or more unstructured document source systems 20, one or more publisher systems 30, and one or more end-user systems 50 via a suitable communication network. In an embodiment, the document segmentation system 100 may be accessible and executable on one or more separate computing devices (e.g., servers). In an embodiment, the document segmentation system 100 may be communicatively coupled to the merchant system 10, unstructured document source system 20, publisher system(s) 30, and end-user system(s) 50 via any suitable interface or protocol, such as, for example, application programming interfaces (APIs), a web browser, JavaScript, etc. In an embodiment, the document segmentation system 100 includes a memory 160 to store instructions executable by one or more processing devices 150 to perform the instructions to execute the operations, features, and functionality described in detail herein.

According to embodiments, the document segmentation system 100 can include one or more software and/or hardware modules to perform the operations, functions, and features described herein in detail, including a sentence segmentation manager 110, an embeddings generator 120, a transformation manager 130, and a topic segmentation manager 140. In one embodiment, the components or modules of the document segmentation system 100 may be executed on one or more computer platforms that are interconnected by one or more networks, which may include a wide area network, wireless local area network, a local area network, the Internet, etc. The components or modules of the document segmentation system 100 may be, for example, a hardware component, circuitry, dedicated logic, programmable logic, microcode, etc., that may be implemented in the processing device(s) 150 to execute instructions stored in the one or more memory devices 160 of the document segmentation system 100.

In an embodiment, the sentence segmentation manager 110 is configured to receive or access one or more unstructured documents including data associated with a merchant system 10. The sentence segmentation manager 110 can obtain, retrieve, receive, or access (collectively, "obtain") the unstructured document which includes text that is in an initial format that lacks segmentation. The sentence segmentation manager 110 can obtain the unstructured document relating to the merchant system 10 from a data graph or knowledge graph (e.g., knowledge graph 105) associated with the merchant system or from one or more unstructured document source systems 20. The data graph (e.g., knowledge graph 105) stores a set of unstructured documents associated with a merchant system 10 that can be processed by the document segmentation system 100 to generate a set of topic-segmented documents. In an embodiment, the knowledge graph 105 (also referred to as a "data graph", "user data graph" or a "user knowledge graph") includes elements of the unstructured documents (e.g., the documents prior to the multi-level machine-learning segmentation processing by the document segmentation system 100) and the topic-segmented documents (e.g., documents generated by the topic segmentation manager 140) that are indexed and searchable to identify data corresponding to a set of documents (i.e., unstructured documents and structured documents) associated with the merchant system 10. In an embodiment, the knowledge graph 140 is generated, managed, and updated in a graph database that can be searched to identify unstructured documents to be segmented by the document segmentation system 100 or identify topic-segmented documents to be provisioned to an end-user system 50, a publisher system 30, or the merchant system 10.

In an embodiment, the sentence segmentation manager 110, embeddings generator 120, and transformation manager 130 co-operatively execute Cross-segment Bidirectional Encoder Representations from Transformers (BERT) processing (also referred to as a "Cross-BERT process) to create a triplet network structure on cross query-property pairs that is used to rank properties. The Cross-BERT processing executed by the sentence segmentation manager 110, the embeddings generator 120 and the transformation manager 130 obtains text data of an input document and performs a first phase or level of machine-learning based processing to generate an initial topic-segmented document including an initial set of topic segments.

In an embodiment, the operations of the Cross-BERT processing perform a "rough" or initial estimation of the topics or topic segments in the input document using BERT embeddings of the text. In an embodiment, the sentence segmentation manager 110 obtains an unstructured document (e.g., a document that is not segmented) (also referred to as an "input document") and initiates the multi-level machine-learning based segmentation processing of the document segmentation system 100. In an embodiment, the sentence segmentation manager 110 executes a sentence segmentation process to identify a set of segmented sentences (e.g., sentence 1, sentence 2, sentence 3 . . . sentence N). In an embodiment, the data of the input document can be processed and transformed into a plain text format with information identifying the respective sentence segments.

In an embodiment, the sentence segmentation manager 110 employs a machine-learning process based on a first Hidden Markov Model (HMM). The first HMM is a statistical model configured to analyze an observable process Y having an outcome that is influenced by unobservable, hidden states X, based on one or more known relationships. These states and the transitions between the states facilitate the decision-making performed by the HMM (e.g., a decision as to whether a portion of the input document is a sentence). For example, the sentence segmentation manager 110 can receive the input document and employ HMM processing to identify the set of sentence segments within the document.

In an embodiment, the embeddings generator 120 generates a set of observations (e.g., embedding 1, embedding 2, embedding 3 . . . embedding N) corresponding to the set of sentence segments generated by the sentence segmentation manager 110. The embeddings generator 120 extracts sentence embedding vectors from the text data (e.g., the set of sentences), where each embedding vector is a list of numbers representing a portion (e.g., a sentence) of the input document for performing further operations (e.g., semantic similarity comparisons) in a vector space. In an embodiment, the vector embeddings can be compared in a quantifiable manner to determine how close the embeddings are to one another as points in a vector space. In an embodiment, one or more machine-learning tasks can be performed using the vector embeddings, such as clustering, classifying, and generating recommendations.

In an embodiment, the transformation manager 130 generates the initial topic segmentation based on the sentences identified by the sentence segmentation manager 110 and the vector embeddings generated by the embeddings generator 120. In an embodiment, the transformation manager 130 generates a pair of percentages [w1, w2] that correspond to a first probability (w1) that a given sentence represents a new topic (e.g., a "new topic" state) and a second probability (w2) that the given sentence represents a same topic (e.g., a "same topic" state). In an embodiment, the identifiable states (new topic state or same topic state) indicate is a given sentence a new topic as compared to one or more previous sentences.

In an embodiment, the weight estimates (w1 representing a new topic or w2 representing a same topic) are provided to the topic segmentation manager 140. The topic segmentation manager 140 is configured to execute a HMM that uses the starting weights for that particular portion of data and generates updated weights to establish a segmented output including a set of topic segments (e.g., topic 1, topic 2, topic 3 . . . topic X). In an embodiment, the HMM executed by the topic segmentation manager 140 is configured to use the same two states as the Cross-BERT processing (e.g., the "new topic" state and the "same topic" state).

In an embodiment, the topic segmentation manager 140 processes a set of start probabilities representing an initial probability of transitioning to a hidden state (also referred to as a "prior probability") and a set of transition probabilities representing a probability of transitioning to a new state from the present or current state. In an embodiment, the transition probabilities are generated by a training process implemented using the HMM, as described in greater detail below with respect to FIGS. 2 and 3.

In an embodiment, for a given sentence, embedding information, and prior probabilities (received from the sentence segmentation manager 110 and the embeddings generator 120), the topic segmentation manager 140 calculates updated weights and utilizes the updated weights to generate an output including a final set of topic segments. The output of the topic segmentation manager 140 (i.e., the topic-segmented document) can be stored in the knowledge graph 105 associated with the merchant system, provisioned to the one or more end-user system(s) 50 (e.g., in response to a search query), the merchant system 10, or one or more publisher systems 30 (e.g., a search engine platform, a publisher website, etc.).

Figure 2:
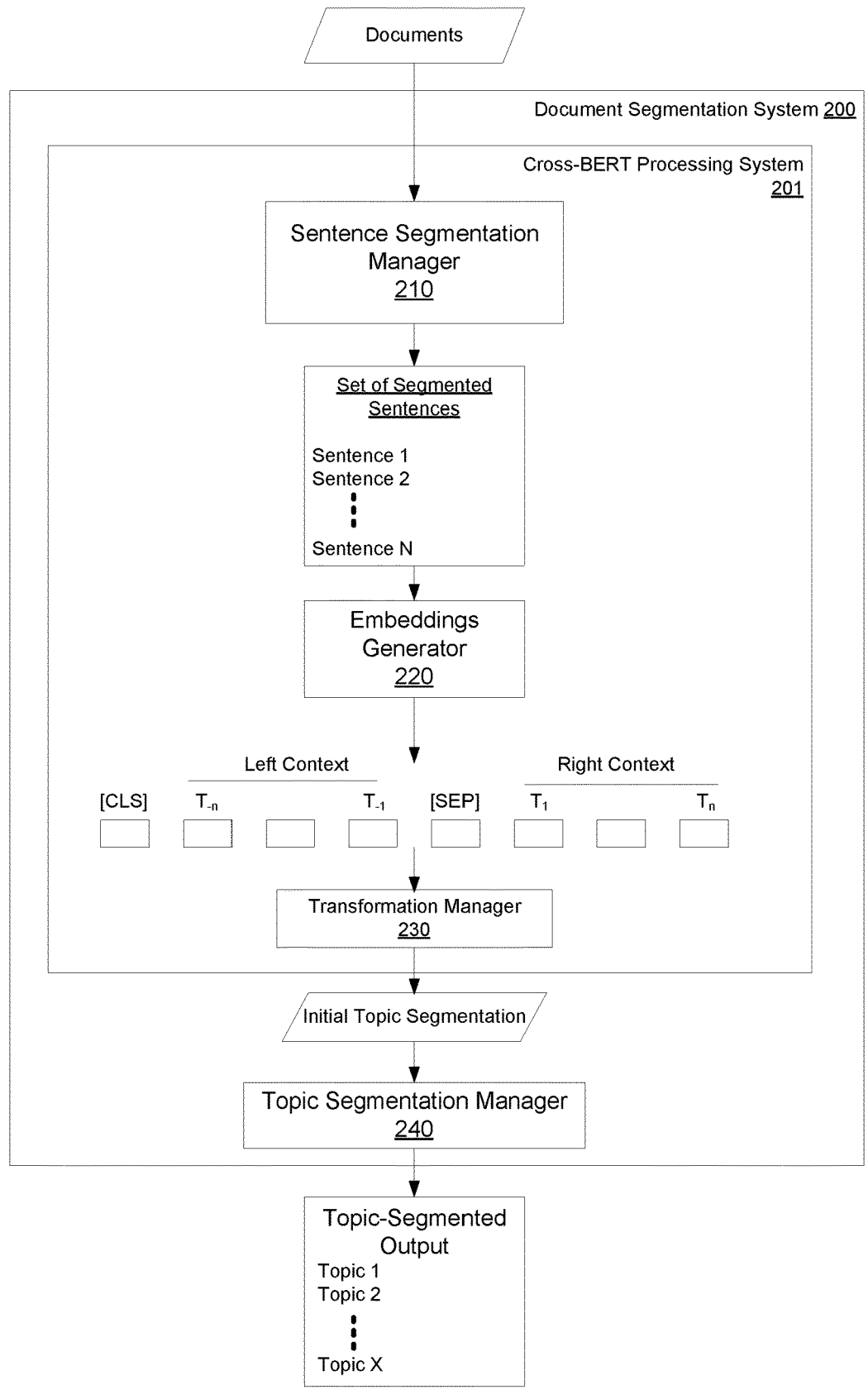
FIG. 2 illustrates an example process flow corresponding to a document segmentation system, according to one or more embodiments of the present disclosure.

FIG. 2 illustrates an example process flow corresponding to a document segmentation system 200, according to embodiments of the present disclosure. As shown in FIG. 2, the document segmentation system 100 includes a Cross-BERT processing system 201 and a topic segmentation manager 240 configured to process a document in accordance with multiple levels of machine-learning processing to generate a topic-segmented output. In an embodiment, the Cross-BERT processing system 201 includes a sentence segmentation manager 210, an embeddings generator 220, and a transformation manager 230. In an embodiment, the sentence segmentation manager 210 reads in the data of the unstructured document (e.g., an unsegmented document) and stores the data in a data structure or data frame (e.g., a list of lists). The entire input document is first segmented into sentences using a first HMM configured to identify sentence segments. The embeddings generator 220 of the Cross-BERT processing system 201 executes Cross-BERT processing to generate initial weight estimates (referred to herein as "w1" and "w2") for the data and generates a vector embedding (e.g., BERT embeddings) for each sentence. The initial weights represent a probability or estimate that a given sentence is a new topic (w1) and a probability or estimate that the given sentence is not a new topic (w2).

In an embodiment, these initial weights are generated by analyzing a local context surrounding a potential or candidate segment break with "n" tokens on either side of the break point. As shown in FIG. 2, the embeddings generator 220 identifies a reserved token (CLS) to represent a start of the sequence, the candidate break or separate segment (SEP), a left context relative to the separator including a first set of n tokens (e.g., tokens $T_{-n}$ to $T_{-1}$), and a right context relative to the separator including a second set of n tokens (e.g., tokens T1 to Tn). In an embodiment, the embeddings generator 220 uses three embeddings to compute the input representations: the token embeddings, segment embeddings, and position embeddings. In an embodiment, the token embeddings can represent a respective word of a sentence (e.g., a vector representation of the token or word. In an embodiment, the segment embeddings can correspond to the respective sentences of the input data. For example, for an input having two sentences, a first sentence embedding is assigned to each of the words of the first sentence and a second sentence embedding is assigned to each of the words of the second sentence. In an embodiment, the sentence embeddings can be based on the sentences as identified by the sentence segmentation manager. In an embodiment, the position embeddings can refer to a token sequence of the input data.

In an embodiment, the Cross-BERT system 201 includes a transformation manager 230 (e.g., a transformer) to generate the initial topic segmentation (e.g., the initial set of weights w1, w2 for each sentence) based on the embeddings. In an embodiment, the transformation manager 230 determines a set of start probabilities (e.g., an initial probability of transitioning to a hidden state) which are used to generate an initial topic segmentation that is outputted by the Cross- BERT system 201 to the topic segmentation manager 240, as shown in FIG. 2. In an embodiment, for each sentence, the transformation manger 230 generates the initial probabilities of the respective sentence being the start of a new topic or not the start of a new topic and the corresponding embeddings.

In an embodiment, the topic segmentation manager 240 uses the starting probabilities or weights (w1, w2) corresponding to the initial topic segmentation and uses a machine-learning model (e.g., an HMM) to generate updated weights that are used to generate the final topic-segmented output. In an embodiment, the topic-segmented output includes a final set of topics (e.g., Topic 1, Topic 2 . . . Topic X), as shown in FIG. 2. In an embodiment, the topic-segmented document (e.g., the final document with the topic segments) may be displayed via a graphical user interface with a visual element or indication corresponding to each of the respective topic segments. For example, the topic-segmented document is generated to include a paragraph break or line break corresponding to each of the identified topic segments, to efficient present the document and improve the readability of the document.

In an embodiment, the topic segmentation manager 240 executes a trained HMM to process the initial or starting weights and the embeddings to generate the updated weights corresponding to the final topic segments. The starting estimations are used as the starting weights for that particular piece of data (e.g., a sentence) in the HMM of the topic segmentation manager 240, which "fine-tunes" these estimates by updating the weights and then outputting the final segmented topics. The HMM of the text segmentation manager 240 can use two states, "T=new topic, N=not a new topic". Advantageously, the states managed by the topic segmentation manager 240 map logically to the initial probabilities generated by the Cross-BERT system (e.g., probabilities of a "new topic" and "not a new topic". Furthermore, management of a small number of states (e.g., two states) by the HMM of the topic segmentation manager 240 results in a more efficient and faster machine-learning processing to generate the desired results (e.g., the topic-segmented document).

Figure 3:
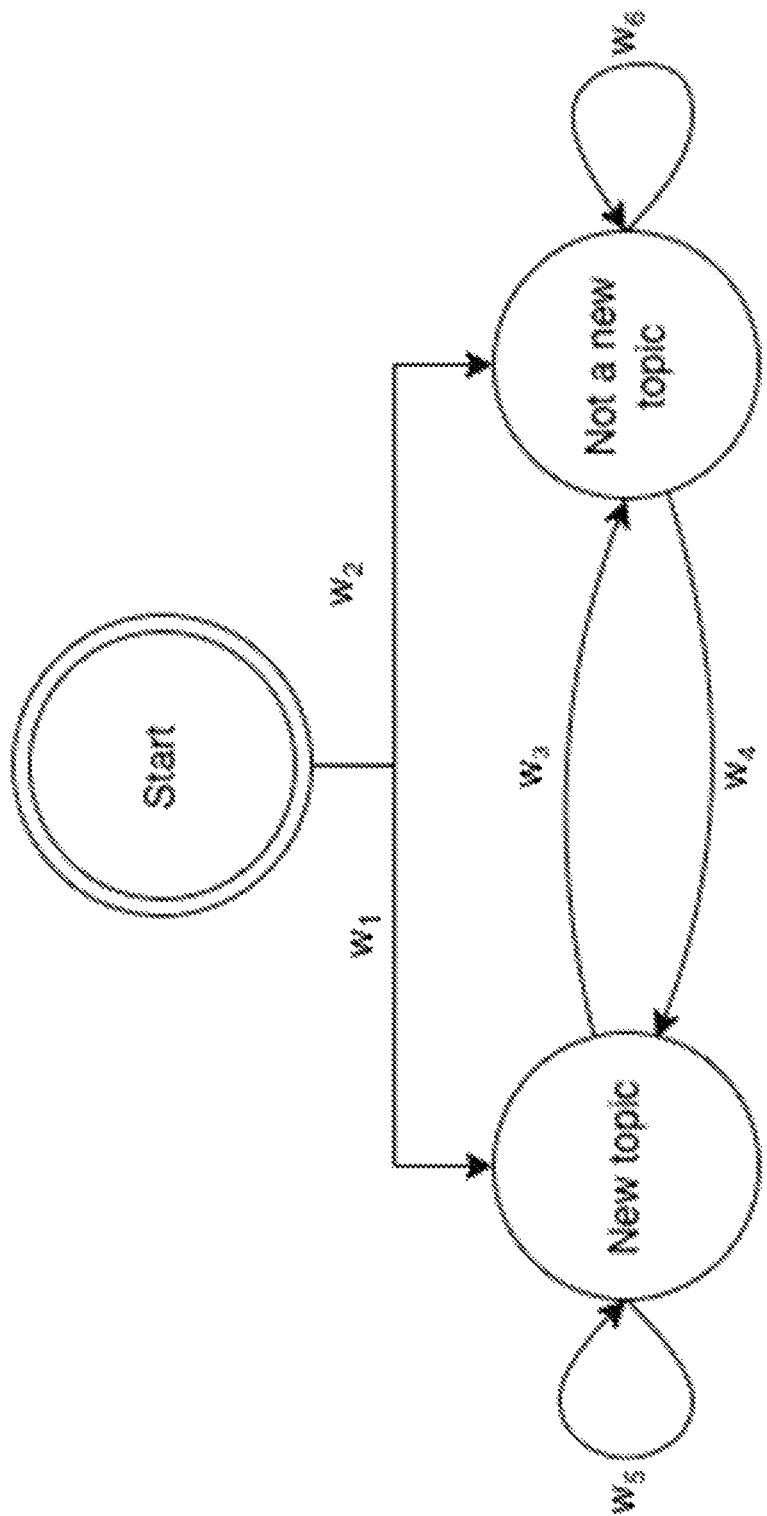
FIG. 3 illustrates an example state diagram associated with statistical modeling executed by a machine-learning model of a topic segmentation manager of a document segmentation system, according to one or more embodiments of the present disclosure.

FIG. 3 illustrates an example state diagram associated with the statistical modeling executed by the HMM of the topic segmentation manager 240, according to embodiments of the present disclosure. As shown, the HMM of the topic segmentation manager 240 is based on an observable process Y whose outcome is influenced by unobservable, hidden states X in some known relationships. These states and the transitions between states facilitate the decision making of the topic segmentation manager 240. In an embodiment, the weights (w) represent the probabilities of transitioning from one state to another. In an embodiment, each sentence is processed to determine if it is in one of the two states (e.g., either the sentence can in either a first state of a "new topic" or a second state of "not a new topic". In an embodiment, the "start" point for the HMM of the topic segmentation manager 240 can be a beginning of a document. In an embodiment, the HMM of the topic segmentation manager 240 can iteratively process each sentence of the document, using the initial weights (e.g., w1 and w2) from the Cross-BERT system, to determine the transition probability weights (i.e., the transition probabilities w3, w4, w5, and w6) relating to the two states.

In an embodiment, the topic segmentation manager 240 uses the observations (e.g., embedding1, embedding2, embedding3 . . . embedding N) corresponding to the sentences and the start probabilities (e.g., the initial weights) received from the Cross-BERT system 201. In an embodiment, if an embedding is processed for a first time, the topic segmentation manager 240 can use a closest known word as an estimate and calculate the transition probabilities based on the estimate. In an embodiment, given a sentence, the embedding information associated with the sentence, and the initial probabilities (from the Cross-BERT system 201), updated weights (a, b) are calculated.

In an embodiment, with reference to FIG. 3, if the last state seen was "new topic", updated weights a and b are represented by the following:

a=w1*w3*previously seen w1
b=w2*w5*previously seen w2.

If the last state seen was "not a new topic" or "same topic", then the updated weights a and b are represented by the following:

a=w1*w4*previously seen w1
b=w2*w6*previously seen w2

In an embodiment, if a>b, then the topic segmentation manager 240 updates the current state of the sentence to "new topic". In an embodiment, if a<b, then the topic segmentation manager 240 determines the current state is "not a new topic" or "same topic" and updates the previously seen weights accordingly.

In an embodiment, the process illustrated in FIG. 3 is performed iteratively for each sentence of the document and the topic segmentation manager 240 returns all of the identified "new topic" sentences. The topic segmentation manager 240 then generates the topic-segmented output including the identified "new topic" sentences.

Figure 4:
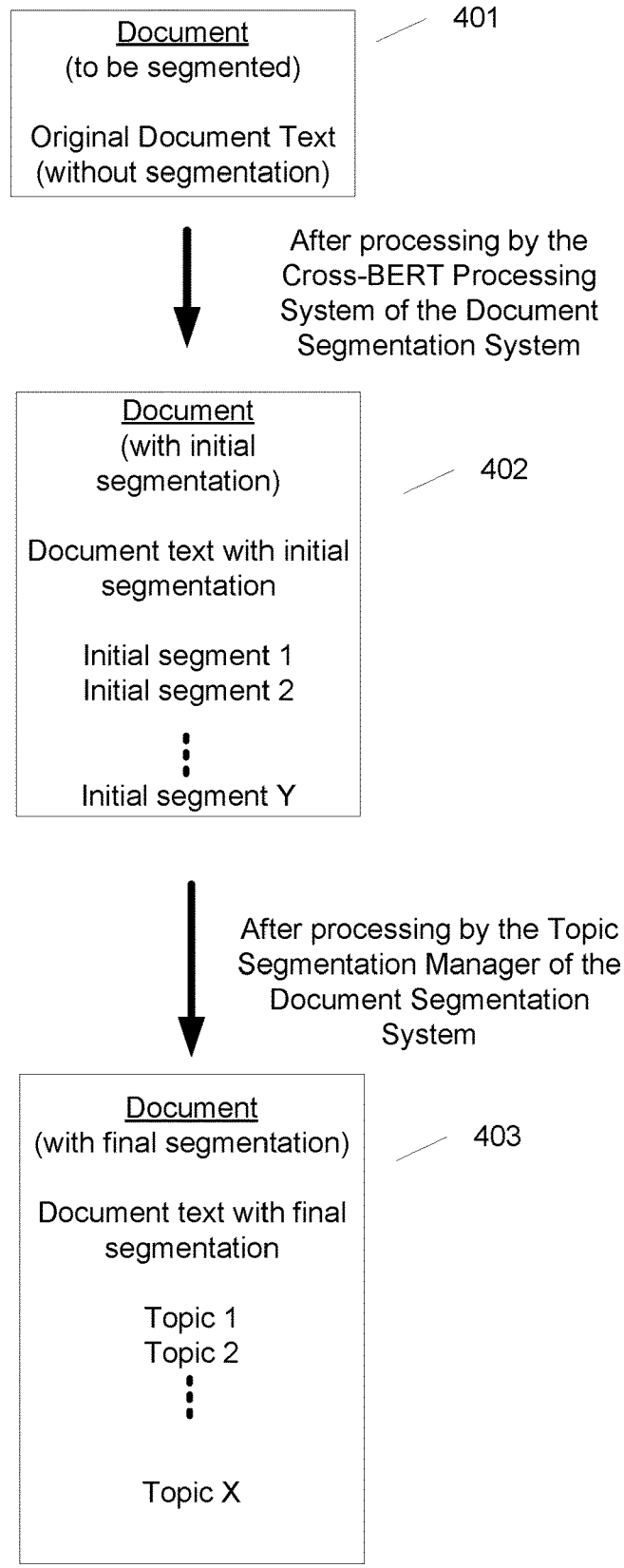
FIG. 4 illustrates an example of a document processed by a document segmentation system, according to one or more embodiments of the present disclosure.

FIG. 4 illustrates an example of a document processed by the document segmentation system (e.g., document segmentation system 100 of FIG. 1 and document segmentation system 200 of FIG. 2). As illustrated, the initial document 401 (i.e., the document without segmentation) is received by the document segmentation system. During a first phase, the Cross-BERT system of the document segmentation system (e.g., the sentence segmentation manager 110, the embeddings generator 120 and the transformation manager 130 of FIG. 1) processes the initial document 401 using a first machine learning model (e.g., a first HMM) and generates a document including an initial segmentation 402. The initial segmentation includes information identifying an initial or "rough" set of topic-based segments (e.g., initial segment 1, initial segment 2 . . . initial segment Y).

As shown in FIG. 4, the topic segmentation manager of the document segmentation system processes the document with the initial segmentation 402 and uses a second machine learning model (e.g., a second HMM) to generate a document with a final segmentation 403. The final segmentation 403 includes information identifying the final set of topic-based segments (e.g., topic 1, topic 2, . . . topic X). In an embodiment, the document with the final segmentation 403 can be stored in a knowledge graph associated with a merchant system that is managed by the document segmentation system or provisioned to an end-user system (e.g., as a search result in response to a search query), a publisher system, the merchant system, etc.

Figure 5:
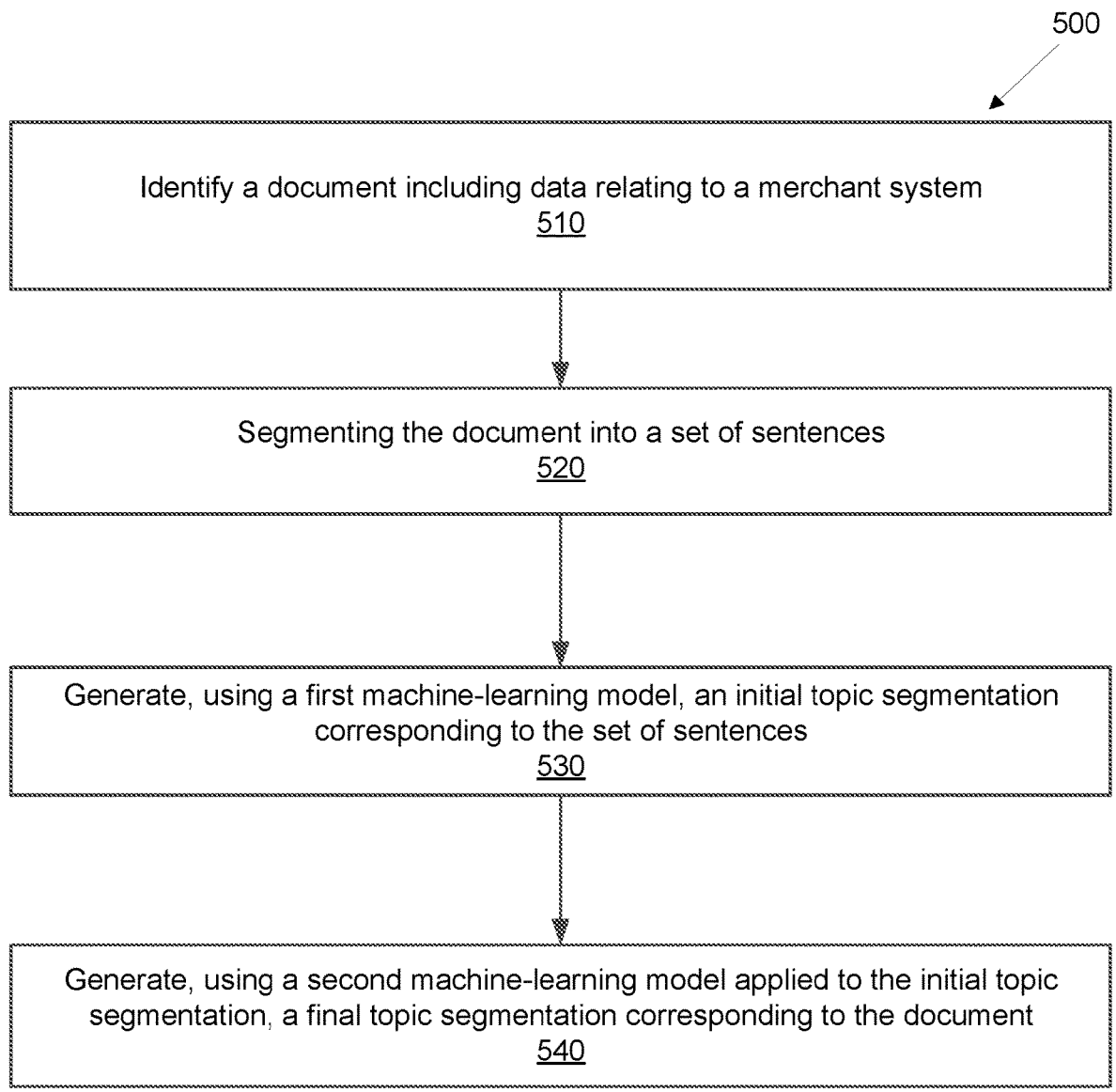
FIG. 5 illustrates a flow diagram relating to an example method including operations performed by a document segmentation system, in accordance with one or more embodiments of the present disclosure.

FIG. 5 illustrates a flow diagram relating to an example method 500 including operations performed by a document segmentation system (e.g., document segmentation system 100 of FIG. 1), according to embodiments of the present disclosure. It is to be understood that the flowchart of FIG. 5 provides an example of the many different types of functional arrangements that may be employed to implement operations and functions performed by one or more modules of the graph merge system as described herein. Method 500 may be performed by a processing logic that may comprise hardware (e.g., circuitry, dedicated logic, programmable logic, microcode, etc.), software (e.g., instructions run on a processing device), or a combination thereof. In one embodiment, processing logic of the document segmentation system executes the method 400 to generate search results including a selected portion or featured snippet in response to a search query relating to data associated with a merchant system.

In operation 510, the processing logic identifies a document including data relating to a merchant system. In an embodiment, the document includes unsegmented data (e.g., unsegmented text) and is identified for processing to be segmented. In an embodiment, the document (e.g., an unstructured document) can include data that relates to the merchant system. For example, the document can include merchant system data such that the document may be identified as a search result in response to a search query relating to the merchant system (e.g., a search query from an end-user system seeking information about the merchant system).

In operation 520, the processing logic segments the document into a set of sentences. The set of sentences can be identified using a machine learning model, such as a HMM, as described in detail above with respect to FIGS. 1-3.

In operation 530, the processing logic generates, using a first machine-learning model (e.g., a first HMM), an initial topic segmentation corresponding to the set of sentences. In an embodiment, the set of sentence-based segments are processed to generate corresponding vector embeddings. In an embodiment, an embedding is generated for each of the sentences in the set of sentences identified in the segmentation step of operation 510. In an embodiment, in operation 530, based on the corresponding embeddings, an initial set of weights (e.g., w1 and w2) is generated for each sentence of the set of sentences, where the initial set of weights represents a first probability (w1) that the given sentence is a new topic and a second probability (w2) that the given sentence is not a new topic. Based on the initial set of weights corresponding to each sentence, the initial topic segmentation is generated.

In operation 540, the processing logic generates, using a second machine-learning model (e.g., a second HMM) applied to the initial topic segmentation, a final topic segmentation corresponding to the document. In an embodiment, the second machine learning model is an HMM trained to iteratively review each sentence of the document and applies the second machine-learning model to the initial set of weights to generate an updated set of weights corresponding to the transition probabilities of the states of the respective sentences. In an embodiment, each sentence can be in a first state where the sentence is considered a new topic (state 1=new topic) or a second state where the sentence is considered to not be a new topic (state 2=not a new topic). In an embodiment, the updated weights corresponding to each sentence, as determined by the second machine-learning model, are used to generate the final topic segmentation of the document. In an embodiment, the final topic segmentation includes information identifying a set of final topics (e.g., each sentences that represents a new or different topic is identified). In an embodiment, a graphical user interface including the document with the topic-segmented data can be generated (e.g., for display to an end-user system).

Figure 6:
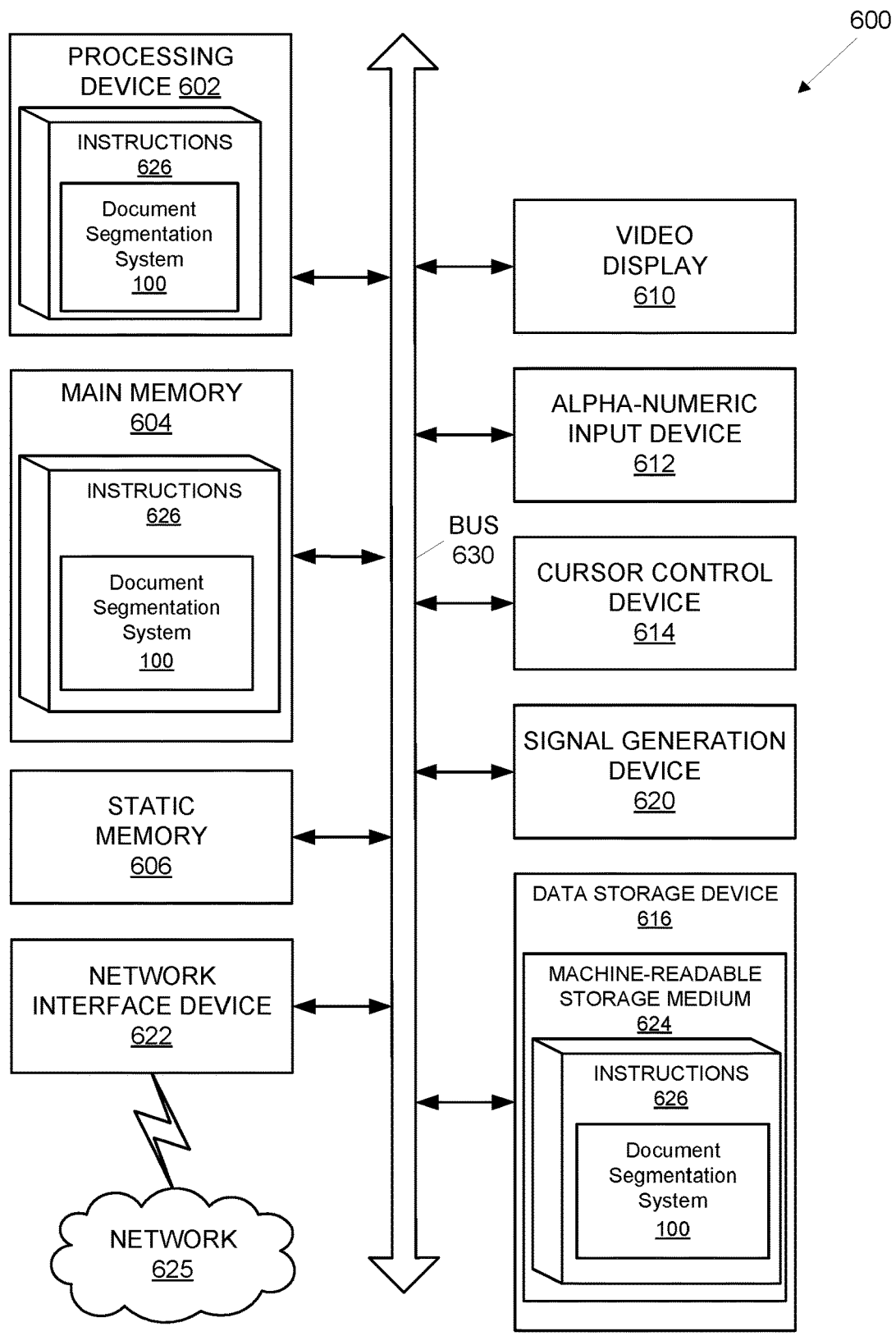
FIG. 6 illustrates an example computer system operating in accordance with one or more embodiments of the present disclosure.

FIG. 6 illustrates an example computer system 600 operating in accordance with some embodiments of the disclosure. In FIG. 6, a diagrammatic representation of a machine is shown in the exemplary form of the computer system 600 within which a set of instructions, for causing the machine to perform any one or more of the methodologies discussed herein, may be executed. In alternative embodiments, the machine 600 may be connected (e.g., networked) to other machines in a local area network (LAN), an intranet, an extranet, or the Internet. The machine 600 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 600. Further, while only a single machine is illustrated, the term "machine" shall also be taken to include any collection of machines that individually or jointly execute a set (or multiple sets) of instructions to perform any one or more of the methodologies discussed herein.

The example computer system 600 may comprise a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 616), which may communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute a document segmentation system 100 for performing the operations and steps discussed herein. For example, the processing device 602 may be configured to execute instructions implementing the processes and methods described herein, for supporting a document segmentation system 100, in accordance with one or more aspects of the disclosure.

Example computer system 600 may further comprise a network interface device 622 that may be communicatively coupled to a network 625. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

Data storage device 616 may include a computer-readable storage medium (or more specifically a non-transitory computer-readable storage medium) 624 on which is stored one or more sets of executable instructions 626. In accordance with one or more aspects of the disclosure, executable instructions 626 may comprise executable instructions encoding various functions of the document segmentation system 100 in accordance with one or more aspects of the disclosure.

Executable instructions 626 may also reside, completely or at least partially, within main memory 604 and/or within processing device 602 during execution thereof by example computer system 600, main memory 604 and processing device 602 also constituting computer-readable storage media. Executable instructions 626 may further be transmitted or received over a network via network interface device 622.

While computer-readable storage medium 624 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "segmenting," "causing," "using," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense.

What is claimed is:

1. A method comprising:
    identifying a document comprising text relating to a merchant system;
    segmenting the document into a set of sentences;
    generating, using a first machine-learning model executed by a processing device, an initial topic segmentation corresponding to the set of sentences based on an initial set of probabilities corresponding to each sentence, wherein, for each sentence of the set of sentences, the first machine-learning model generates the initial set of probabilities comprising a first probability corresponding to a first state and a second probability corresponding to a second state, and wherein the first state indicates that the sentence is a new topic and the second state indicates that the sentence is not a new topic; and
    generating, using a second machine-learning model applied to the initial topic segmentation, a final topic segmentation corresponding to the document.

2. The method of claim 1, further comprising:
    causing generation of a graphical user interface including the document comprising one or more visual elements corresponding to a set of topics of the final topic segmentation.

3. The method of claim 1, wherein the document is segmented into the set of sentences by executing a machine-learning model trained to identify a sentence from the text of the document.

4. The method of claim 1, wherein the first machine-learning model comprises a first hidden markov model trained to identify a vector embedding corresponding to each sentence of the set of sentences.

5. The method of claim 4, wherein the second machine-learning model is a second hidden markov model trained to identify, for each sentence, a set of updated probabilities based on the vector embedding and the first probability and the second probability.

6. The method of claim 5, wherein the final topic segmentation comprises a final set of topics determined based on the set of updated probabilities.

7. A system comprising:
    a memory to store instructions; and
    a processing device operatively coupled to the memory, the processing device to execute the instructions to perform operation comprising:
    identifying a document comprising text relating to a merchant system;

segmenting the document into a set of sentences;
generating, using a first machine-learning model, an initial topic segmentation corresponding to the set of sentences based on an initial set of probabilities corresponding to each sentence, wherein, for each sentence of the set of sentences, the first machine-learning model generates the initial set of probabilities comprising a first probability corresponding to a first state and a second probability corresponding to a second state, and wherein the first state indicates that the sentence is a new topic and the second state indicates that the sentence is not a new topic; and
generating, using a second machine-learning model applied to the initial topic segmentation, a final topic segmentation corresponding to the document.

8. The system of claim 7, the operations further comprising causing generation of a graphical user interface including the document comprising one or more visual elements corresponding to a set of topics of the final topic segmentation.

9. The system of claim 7, wherein the document is segmented into the set of sentences by executing a machine-learning model trained to identify a sentence from the text of the document.

10. The system of claim 7, wherein the first machine-learning model comprises a first hidden markov model trained to identify a vector embedding corresponding to each sentence of the set of sentences.

11. The system of claim 10, wherein the second machine-learning model is a second hidden markov model trained to identify, for each sentence, a set of updated probabilities based on the vector embedding and the first probability and the second probability.

12. The system of claim 11, wherein the final topic segmentation comprises a final set of topics determined based on the set of updated probabilities.

13. A non-transitory computer readable storage medium having instructions that, if executed by a processing device, cause the processing device to perform operations comprising:

identifying a document comprising text relating to a merchant system; segmenting the document into a set of sentences;
generating, using a first machine-learning model executed by a processing device, an initial topic segmentation corresponding to the set of sentences based on an initial set of probabilities corresponding to each sentence, wherein, for each sentence of the set of sentences, the first machine-learning model generates the initial set of probabilities comprising a first probability corresponding to a first state and a second probability corresponding to a second state, and wherein the first state indicates that the sentence is a new topic and the second state indicates that the sentence is not a new topic; and
generating, using a second machine-learning model applied to the initial topic segmentation, a final topic segmentation corresponding to the document.

14. The non-transitory computer readable storage medium of claim 13, the operations further comprising causing generation of a graphical user interface including the document comprising one or more visual elements corresponding to a set of topics of the final topic segmentation.

15. The non-transitory computer readable storage medium of claim 13, the operations further comprising executing a search algorithm to identify the document in view of a search query.

16. The non-transitory computer readable storage medium of claim 13, the operations further comprising:
generating, by the first machine-learning model, a first set of probabilities corresponding to the set of sentences; and
for each sentence, identifying, by the second machine-learning model comprising a trained second hidden markov model, a set of updated probabilities based on a vector embedding corresponding to each sentence and the first probability and the second probability corresponding to each sentence.

* * * * *